(12) United States Patent
Hauch et al.

(10) Patent No.: US 7,029,393 B2
(45) Date of Patent: Apr. 18, 2006

(54) SPLIT INLET SEAL FOR GRAIN SEPARATORS AND METHOD

(75) Inventors: David A. Hauch, Afton, MN (US); Matthew J. Ernst, North Oaks, MN (US)

(73) Assignee: Carter Day International, Inc., Minneapolis, MN (US)

( * ) Notice: Subject to any disclaimer, the term of this patent is extended or adjusted under 35 U.S.C. 154(b) by 0 days.

(21) Appl. No.: 10/912,629

(22) Filed: Aug. 5, 2004

(65) Prior Publication Data

US 2005/0032560 A1 Feb. 10, 2005

Related U.S. Application Data

(60) Provisional application No. 60/493,385, filed on Aug. 6, 2003.

(51) Int. Cl.
*A01F 12/44* (2006.01)
*B07B 1/00* (2006.01)

(52) U.S. Cl. .......... 460/79; 277/390

(58) Field of Classification Search .......... 209/687; 460/79, 80, 81, 83; 277/394, 390, 370, 377, 277/371, 379
See application file for complete search history.

(56) References Cited

U.S. PATENT DOCUMENTS

| | | | |
|---|---|---|---|
| 7,174 A | 3/1850 | Menefee | |
| 37,319 A | 1/1863 | Cochrane | |
| 137,430 A | 4/1873 | Foreman et al. | |
| 171,525 A | 12/1875 | Merritt | |
| 310,335 A | 1/1885 | Tracy | |
| 1,683,918 A | 9/1928 | Riddell | |
| 2,015,400 A | 9/1935 | Ingraham | |
| 2,182,638 A | 12/1939 | Mjolsness | |
| 2,833,572 A * | 5/1958 | Charles | 277/329 |
| 2,861,684 A | 11/1958 | MacGillivray | |
| 3,072,414 A * | 1/1963 | Porges | 277/394 |
| 4,392,421 A | 7/1983 | Yano et al. | |
| 4,392,500 A * | 7/1983 | Houle | 460/85 |
| 4,441,412 A | 4/1984 | Imamura et al. | |
| 4,574,815 A * | 3/1986 | West et al. | 460/80 |
| 4,722,558 A * | 2/1988 | Badoureaux | 285/39 |
| 4,730,554 A | 3/1988 | Kristiaan | |
| 5,087,101 A | 2/1992 | Justice et al. | |
| 5,116,066 A * | 5/1992 | Crawford | 277/384 |
| 5,335,792 A | 8/1994 | Hauch | |
| 5,403,020 A * | 4/1995 | McOnie | 277/390 |
| 5,816,624 A * | 10/1998 | Smith | 285/276 |
| 6,050,788 A * | 4/2000 | McEwen et al. | 417/423.11 |

(Continued)

Primary Examiner—Árpád Fábián Kovács
(74) Attorney, Agent, or Firm—Fredrikson & Byron, P.A.

(57) ABSTRACT

A grain separator having an easily replaceable seal. The separator comprises a housing and a rotatable grain separation drum carried by the housing, the drum having an end face with an external annular bearing surface. A drive shaft extends axially into the drum through the end face, and a grain inlet is carried exteriorly of the housing and includes a bearing rotationally supporting an end of the drive shaft. The inlet includes an inlet spout that extends through the end face for conveying grain to the drum. An easily removable and replaceable split seal is carried about the inlet spout and engages the annular bearing surface to seal the drum from the exterior of the inlet spout, and pressure means are provided for applying axial pressure to the split seal to urge the seal against the annular bearing surface. Disclosed also is a method for seal replacement.

20 Claims, 4 Drawing Sheets

U.S. PATENT DOCUMENTS 6,177,644 B1 * 1/2001 Wilkie et al. ............ 219/69.17
6,217,028 B1 * 4/2001 Wilke ........................ 277/370
6,120,034 A * 9/2000 Kowalski et al. ........... 277/377
6,168,163 B1 * 1/2001 Thorson et al. ............. 277/419

* cited by examiner

SPLIT INLET SEAL FOR GRAIN SEPARATORS AND METHOD

CROSS-REFERENCE TO RELATED APPLICATIONS

This application claims priority to U.S. Application Ser. No. 60/493,385, filed on Aug. 6, 2003, entitled "Improved Split Inlet Seal For Grain Separators", which is incorporated herein by reference.

FIELD OF THE INVENTION

The invention relates to easily replaceable split seals for use in grain separators.

BACKGROUND OF THE INVENTION

Grain separators are employed to separate a stream of grain containing various types and sizes of grain into constituent parts. Typical grain separators are used to separate such grains as wheat, durum, oats, barley and rice.

A grain separator is described in Hauch, U.S. Pat. No. 5,335,792. The grain separator includes a drum that rotates about a horizontal axis. Grain of varying sizes or types is added through an inlet at one end of the drum. Small indentations formed on the cylindrical wall of the drum capture the individual grain particles, and as the drum rotates, these particles are lifted until the fall from the indentations into an interior trough. The trough may be so oriented as to capture grain particles of a given size range. Grain is moved from the inlet into the drum by means of a rotatable heliacal screw which typically is driven by an electric motor through linkage including a drive shaft. The end of the drum nearest the grain inlet is provided with an end face, and the grain inlet includes a spout that extends through the end face to convey grain to the drum. The drive shaft may be mounted through appropriate bearings at the grain inlet. To provide a suitable seal between the grain inlet, which is stationary, and the drum, which rotates, an annular seal commonly is provided between the inlet and the drum.

Annular seals of the type described are highly susceptible to failure if grain or other debris finds its way between the bearing surface of the seal and the end plate surface of the drum against which the seal slides, and it is necessary, when this seal fails, to replace the seal. In the past, this has required disassembly of the grain inlet from the housing structure that supports the drum, or removal of the drum itself, and either of these approaches may be time consuming and difficult to accomplish, leading to undesired loss of production.

SUMMARY OF THE INVENTION

In one embodiment, the invention involves a grain separator having an easily replaceable seal, the separator comprising a housing and a rotatable grain separation drum carried by the housing, the drum having an end face with an external annular bearing surface. A drive shaft extends axially into the drum through the end face, and a grain inlet is carried exteriorly of the housing and includes a bearing rotationally supporting an end of the drive shaft. The grain inlet includes an inlet spout extending through the end face for conveying grain to the drum. A split seal is carried about the inlets spout, and is engagable with the annular bearing surface to seal the drum from the exterior of the inlet spout. Pressure means for applying actual pressure to the split seal is provided to urge the seal against the annular bearing surface.

In another embodiment, the invention relates to a method of replacing an annular seal between the inlet spout and the drum of a grain separator. The method comprises withdrawing axially movable seal-supporting structure axially away from the drum from a first position along the spout to provide manual access to the seal. The seal is disassembled into two or more segments and removed. A replacement seal is installed about the spout by joining replacement seal segments together. The seal supporting structure is then axially restored to its first position.

DETAILED DESCRIPTION

Figure 1:
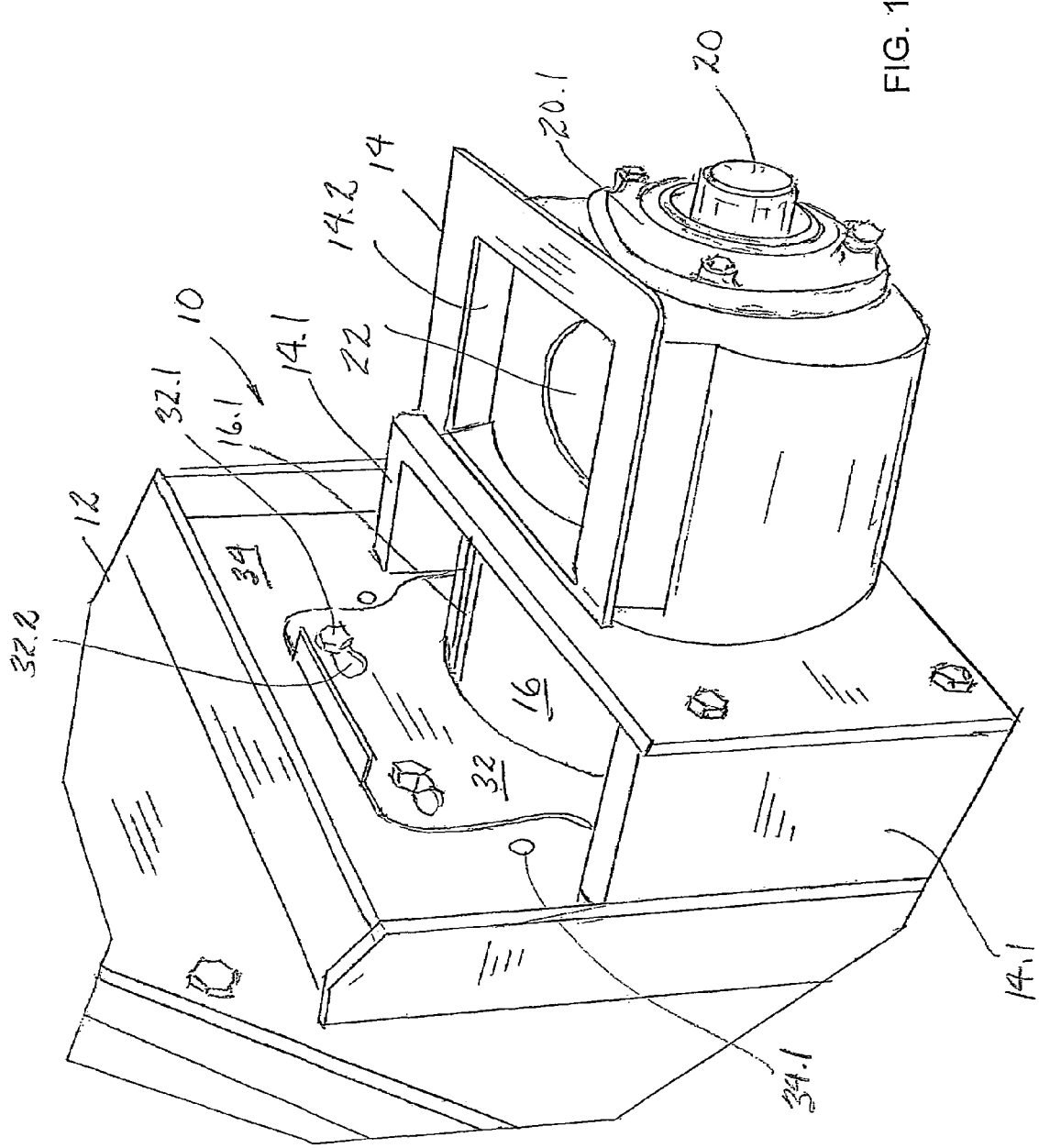
FIG. 1 is a perspective, broken away view of a grain separator and particularly the grain inlet.
Figure 2:
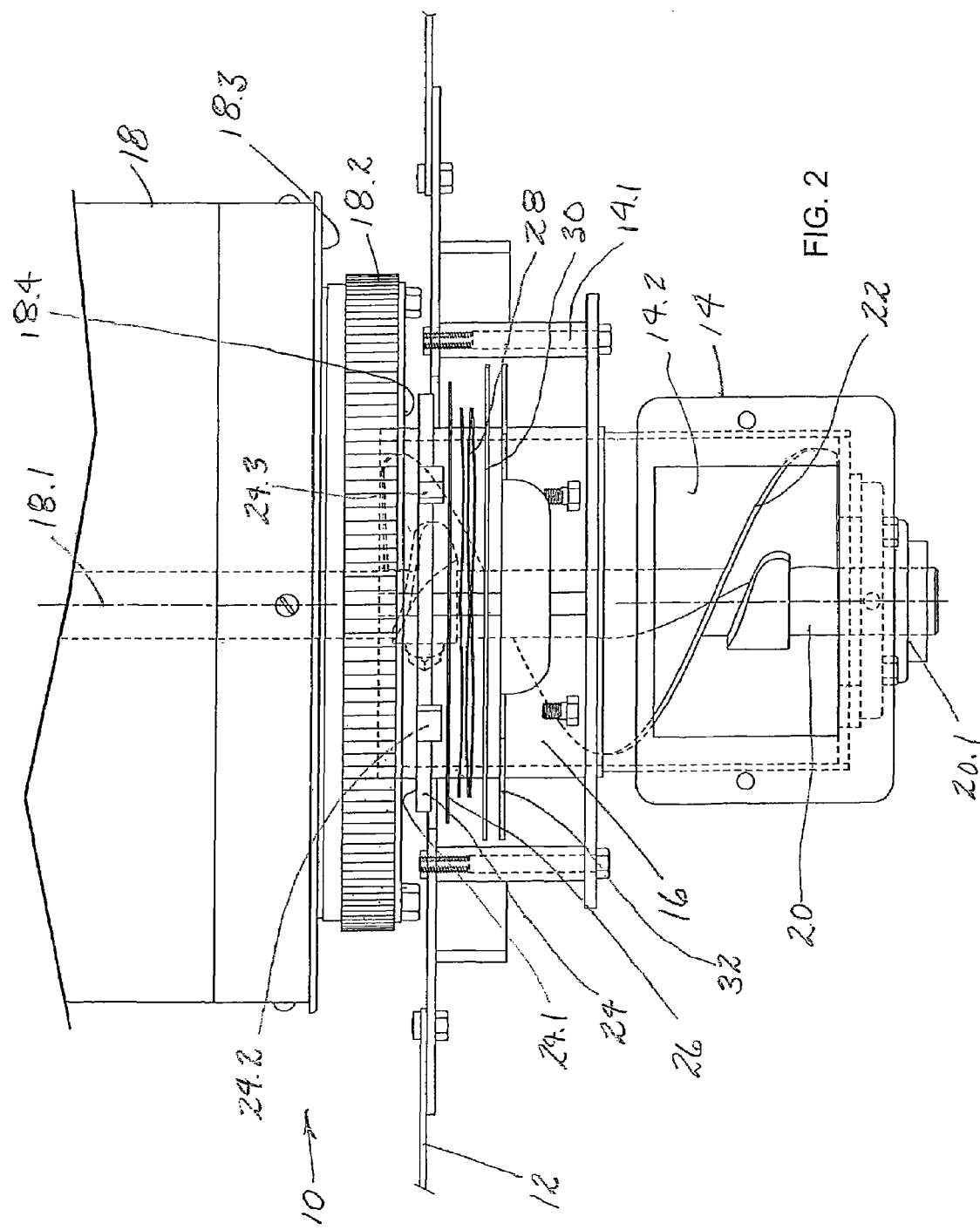
FIG. 2 is a broken away, exploded top view of the grain separator of FIG. 1.

In the embodiment of FIGS. 1 and 2, a grain separator is shown generally as 10, the separator having a housing 12. A grain inlet is shown generally as 14 and comprises an upwardly open container into which grain may be poured, the grain inlet including a spout 16. A drum 18 (FIG. 2) is supported in the housing for rotation about its axis 18.1 by means of a drive belt 18.2. A drive shaft 20 extends through the grain inlet 14 and is supported at its end by a bearing block 20.1. The drive shaft extends into the drum, and is supported at its other end beyond the far end of the drum (not shown). Drive shaft 20 is provided with a helical screw portion 22 within the grain inlet 14 for the purpose of driving grain through the spout 16 and into the drum 18. Another helical thread portion (not shown) is driven by the drive shaft within the drum, and this may occur in the manner shown in co-owned U.S. Pat. No. 5,335,792, the contents of which are incorporated herein by reference.

Referring to FIG. 1, the grain inlet 14 includes a standoff structure 14.1 that is attached to an inlet mounting subplate 34 and spaces the grain inlet opening 14.2 a predetermined distance away from the end 18.3 of the drum, thus exposing a predetermined length of the spout 16 to render it manually accessible, as will be described further below.

With reference to FIG. 2, which shows the mechanism at the grain inlet end of the grain separator in an exploded view, the drum 18 is shown as having an end face 18.4 that provides an annular bearing surface surrounding the opening into the drum. An annular seal 24 is positioned about the spout 16 and has a bearing surface 24.1 that confronts and engages the annular bearing surface 18.4 of the drum. The split seal 24 is supported by a support ring 26, of which more will be said in connection with FIG. 3. An annular wave spring 28 of known design is positioned about the spout 16, followed by an optional shim 30, which may itself be split to enable it to be assembled with and disassembled from the split ring supporting structure. Each shim may take the form of a plate of given thickness, the plate having one edge provided with a generally semicircular opening such that when the shims are mounted on either side of the spout, the semicircular openings face each other and provide an opening accommodating the spout.

A cover shown at 32 is provided, the cover being shown also in FIG. 1. The cover, shim, wave spring, support ring and split seal all are movable axially along the spout.

Figure 3:
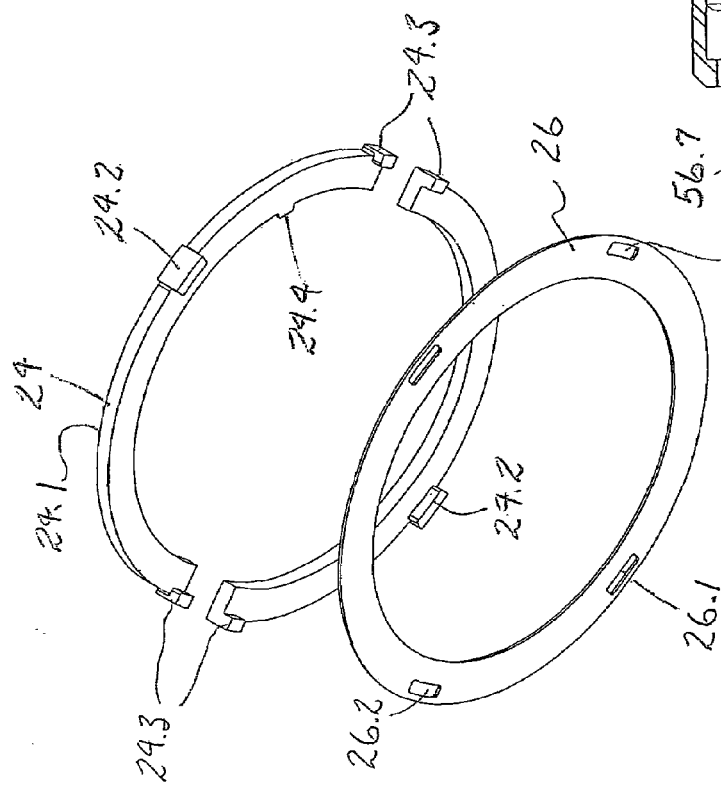
FIG. 3 is a perspective view of a split seal and support ring.

Referring again to FIG. 3, the split seal 24 may be made of any appropriate sealing material that is adapted to seal against the annular bearing face of the drum. The seal may be made, for example, from an acetal resin such as Delrin® (DuPont), from polyethylene (particularly ultra high molecular weight polyethylene), poly(tetrafluouroethylene), felt, or other material. FIG. 3 shows the seal as it may be made of Delrin®, the seal being provided in two segments, although three or more segments could be used if desired. The split seal may have tabs, shown at 24.2 that extend away from the bearing surface 24.1 of the seal, the tabs extending through similarly shaped slots 26.1 formed through the thickness of the support ring 26. The ends of the seal segments have smaller tabs 24.3 sized so that when the seal segment ends are juxtaposed, the confronting tabs 24.3 are both received within appropriately shaped slot 26.2 formed through the thickness of the support ring.

In this embodiment, then, although the split seal 24 itself may be separated into two or more segments, the support ring 30 is not segmented, and, during replacement of seals, remains about the spout 16. It will be understood that the support ring 30 itself may be segmented as desired.

Referring to FIG. 1, the further structure and method of this embodiment may be described in connection with a method of replacing a split seal that has worn out or has become torn or otherwise damaged.

Cover 32 is mounted to an inlet mounting subplate 34, which is part of the housing 12, by a series of bolts 32.1, which also serve to mount optional shims. The embodiment of FIG. 1 may use four mounting bolts 32.1 that are spaced about the circumference of the spout, the upper two of which are shown in FIG. 1above the spout 16 and the other two of which are beneath the spout to engage a substantially identical portion of the cover 32 that projects beneath the spout. The mounting bolts 32.1 pass through respective slotted holes 32.2 formed in the cover, the slots desirably having a key hole configuration with the larger end of each slot permitting passage through it of the head of a mounting bolt. In this manner, once the mounting bolts are loosened, the cover can be rotated slightly about its axis (clockwise in FIG. 1) to line up the bolt heads with the larger ends of the respective key hole slots to enable the cover to be withdrawn axially away from the subplate 34, as shown in FIG. 2. Any shims 30 that had been used can be removed at this time as well, the split nature of the shims permitting them to be removed outward from the spout 16.

Wave spring 28 is then moved axially along the spout away from the drum, as shown in FIG. 2, to expose the split seal 24 and the split seal support ring 26. The split seal can be removed from the support ring manually by withdrawing the tabs 24.2, 24.3 from the respective slots in the support ring, and the split seal segments can then be removed easily and discarded. A replacement split seal is then provided, its tabs 24.2, 24.3 inserted through the respective slots in the support ring, and the split seal is moved axially to bring its bearing surface 24.1 into contact with the bearing surface 18.4 of the drum. The wave spring 28 is then moved into contact with the support ring 26, and it may be noted here that the diameter of the wave spring desirably is less than the diameter spacing the tabs 24.2 of the split ring (see FIG. 3) so that the confronting face of the wave spring abuts the surface of the support ring 26. The cover 32 is then moved forward against the wave spring to compress it, the bolt heads are received within the key hole slots 32.2 of the cover, and the cover is rotated slightly to lock the bolt heads against the smaller diameter portion of the key hole slots. If less pressure is desired on the split ring, the shims 30 shown in FIG. 2 may be inserted from the top and bottom between the cover 32 and the inlet mounting subplate 34, the shims having slots within which the bolts 32.1 are received. The bolts are then tightened and the machine is ready for use.

As shown is FIGS. 1 and 2, the spout 16 has a surface that is provided with an axially extending groove 16.1, and the split ring 24 is provided with a radially inwardly projecting finger 24.4 that is slightably received in the groove 16.1 the finger and groove cooperating to prevent rotation of the seal with respect to the grained inlet. The finger 24.4, of course, could be provided on the support ring 26.

Although the cover and shim plates have been described as being held to the subplate 34 by bolts positioned above and below the spout, the bolts can be placed where desired about the spout, and additional threaded holes 34.1 may be provided to receive the threaded bolts.

Figure 4:
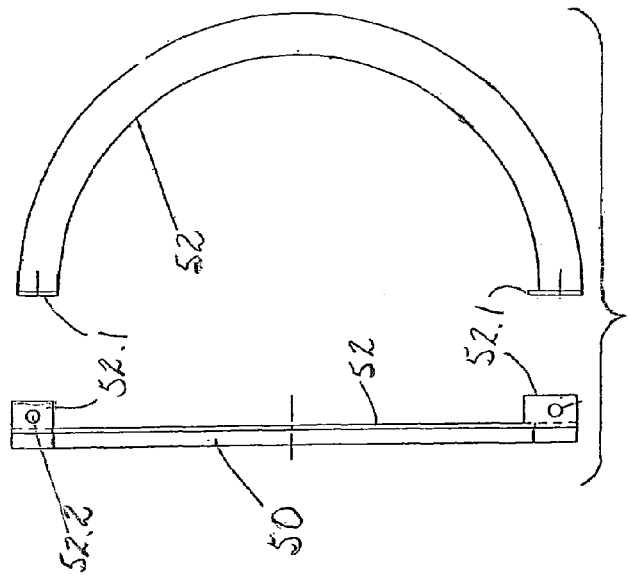
FIG. 4 is a view of another split seal and support ring embodiment.
Figure 5:
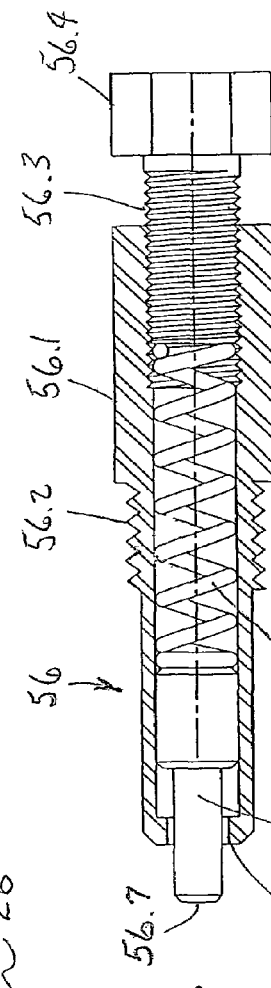
FIG. 5 is a cross sectional view of a spring-loaded plunger.
Figure 6:
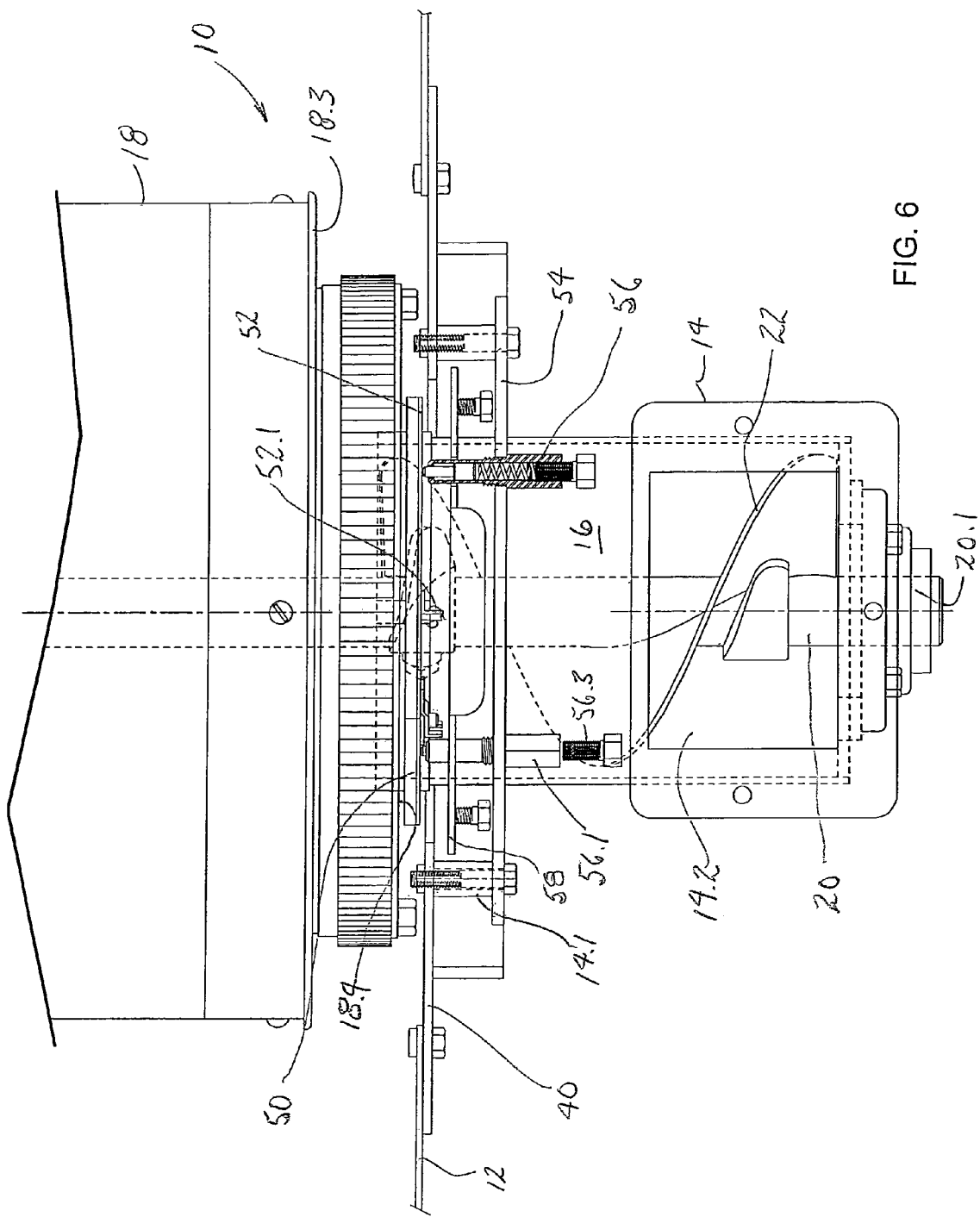
FIG. 6 is an exploded, broken away top view of an embodiment of the invention employing the plunger shown in FIG. 5.

A modified embodiment of a grain separator is shown in FIGS. 4 through 6. This embodiment is similar to that of FIGS. 1–3, and in certain respects, identical numbers have been used to identify similar features.

An inlet mounting subplate 40 is mounted to the frame 12 and has an opening in it that is large enough to accommodate a split seal, shown at 50. The split seal is shown best in FIG. 4 as consisting of two semicircular segments 50.1. The seal portion itself may be made of any appropriate sealing material as described above in connection with the embodiment of FIGS. 1–3. For purposes of illustration, the seal in FIG. 4 may be made of felt. The support ring, also split in this embodiment, is shown at 52. The support ring segments have outwardly turned ends 52.1, the ends having a small bore 52.2 formed through them. It will be understood that FIG. 4, which shows both front and side views, illustrates only half of a split seal, the other half being identical. The seal material may be glued or otherwise affixed to the support ring, and the inwardly turned ends of the support rings segments may be fastened together using small bolts and nuts, for example, or by any other means.

Returning to FIG. 6, the grain inlet 14 is similar to that shown in FIG. 2, and similarly has standoff bars 14.1 that are mounted to the inlet subplate 40, as shown, to space the grain inlet opening 14.2 away from the end 18.3 of the drum. This, in turn, provides a distance along the spout that can be accessed manually to enable the split seal to be replaced easily.

The grain inlet includes a mounting plate 54 from which the stand off bars 14.1 extend. A plurality of spring loaded plungers 56 (shown also in FIG. 5) each have a body that is threaded through a bore in the plate 54. With reference to FIG. 5, each of the plungers 56 includes a body portion 56.1 having an exteriorly threaded portion 56.2 for threaded reception in the bores of the mounting plate 54. The interior of the body 56.1 is hollow, and includes at one end an internally threaded portion receiving a threaded rod 56.3, the rod terminating outwardly in a hexagonal cap 56.4. At its other end, each plunger has an axially movable driver 56.5 having a portion that extends outward through an opening 56.6 in the end of the body and terminates in an outer bearing surface 56.7. The driver 56.5 and the opening 56.6 at the end of the body have confronting shoulders preventing the driver from completely escaping from the end of the body. Between the threaded rod 56.3 and the driver 56.5 is positioned a helical compression spring 56.8 that seats against the confronting surfaces of the driver and the threaded rod and which urges the driver outward of the body. Spring force can be adjusted by advancing the threaded rod inward or outward of the body. The body 56.1 itself may have a hexagonal cross section, as shown in FIG. 6, to enable it to be forcefully threaded into the mounting plate bores using an appropriate wrench.

FIG. 6 illustrates a cover 58 that may be bolted as shown to the inlet mounting sub plate 40 to protect the split seal from contact with spilled grain or the like as it is poured into the inlet 14.2. The plungers 56 extend through openings in the cover and into contact with the exterior face of the support ring 52 to force the split seal against the annular bearing surface 18.4 of the drum. As the seal wears, as through repeated use, the spring pressure holding the split seal against the drum can be adjusted by advancing the threaded portion 56.3 of the plungers into the body 56.1.

To replace the split seal, the plungers 56 are backed out of the holes in the mounting plate 54, thereby removing spring pressure from the split seal. The cover 58 is unbolted and is moved axially on the spout 16 away from the drum to expose the split seal and its support ring. The support ring carrying the split seal is disassembled and removed, and a replacement support ring with split seal is then assembled about the spout. The split ring is advanced into contact with the annular bearing surface of the drum, the cover 58 is remounted, and the plungers are again mounted to the support plate 54 with the spring loaded projections extending axially inwardly into contact with the support ring. By adjusting the axial position of the threaded rod within each plunger body, the desired degree of spring pressure against the split seal can be varied as desired.

While preferred embodiments of the present invention have been described, it should be understood that various changes, adaptations and modifications may be made therein, without departing from the spirit of the invention and the scope of the appended claims.

The invention claimed is:

1. A grain separator having an easily replaceable seal, comprising a housing, a rotatable grain separation drum carried by the housing, the drum having an end face with an external annular bearing surface, a drive shaft extending axially into the drum through the end face, a grain inlet carried exteriorly of the housing and including a bearing rotationally supporting an end of the drive shaft, the inlet including an inlet spout extending through the end face for conveying grain to the drum, a split seal carried about the inlet spout and engagable with the annular bearing surface to seal the drum from the exterior of the inlet spout, the split seal comprising a seal body and a support ring to which the seal body is fastened, and pressure means for applying axial pressure to the split seal to urge the seal against the annular bearing surface.

2. The grain separator of claim 1 wherein said pressure means comprises an inlet plate carried by the grain inlet, and spring means operatively positioned between the inlet plate and the split seal to urge the seal against the annular bearing surface.

3. The grain separator of claim 2 wherein the spring means comprises a plurality of removable spring loaded plungers carried by the inlet plate and spaced circumferentially about the inlet spout, each plunger including a spring and an axially extending protrusion urged by the spring against the split seal to press the latter against the annular bearing surface of the drum.

4. The grain separator of claim 3 wherein the inlet plate is spaced from the split seal by a distance such that when the plungers are removed, the seal may be sufficiently withdrawn axially from contact with the annular bearing surface as to enable the seal to be removed and replaced with another split seal.

5. The grain separator of claim 4 wherein the seal body comprises two or more segments, and means for fastening the segments end-to-end about the inlet spout to form said split seal.

6. The grain separator of claim 2 wherein said spring means comprises a wave spring carried about said spout and urging the split seal against the annular bearing surface.

7. The grain separator of claim 1 wherein the seal body includes a plurality of tabs and the support ring includes a plurality of openings within which the tabs are received.

8. A grain separator having an easily replaceable seal, comprising a housing, a rotatable grain separation drum carried by the housing, the drum having an end face with an external annular bearing surface, a drive shaft extending axially into the drum through the end face, a grain inlet carried exteriorly of the housing and including a bearing rotationally supporting an end of the drive shaft, the inlet including an inlet spout extending through the end face for conveying grain to the drum, a split seal carried about the inlet spout and engagable with the annular bearing surface to seal the drum from the exterior of the inlet spout, and pressure means for applying axial pressure to the split seal to urge the seal against the annular bearing surface, wherein said pressure means comprises an inlet plate carried by the grain inlet, and spring means operatively positioned between the inlet plate and the split seal to urge the seal against the annular bearing surface.

9. The grain separator of claim 8 wherein the spring means comprises a plurality of removable spring loaded plungers carried by the inlet plate and spaced circumferentially about the inlet spout, each plunger including a spring and an axially extending protrusion urged by the spring against the split seal to press the latter against the annular bearing surface of the drum.

10. The grain separator of claim 9 wherein the inlet plate is spaced from the split seal by a distance such that when the plungers are removed, the seal may be sufficiently withdrawn axially from contact with the annular bearing surface as to enable the seal to be removed and replaced with another split seal.

11. The grain separator of claim 10, the seal body and support ring comprising two or more segments, and means for fastening the segments end-to-end about the inlet spout to form said split seal.

12. The grain separator of claim 8 wherein said spring means comprises a wave spring carried about said spout and urging the split seal against the annular bearing surface.

13. The grain separator of claim 12, the seal body comprising two or more segments configured to be assembled about the spout and supported by the support ring.

14. The grain separator of claim 13 wherein the seal body includes a plurality of tabs and the support ring includes a plurality of openings within which the tabs are received.

15. The grain separator of claim 13 wherein said spout includes an axially extending external groove, and wherein said split seal includes a finger slidably receivable in the groove to restrain relative rotation between the spout and the split seal.

16. The grain separator of claim 12 wherein the inlet plate is axially movable with respect to the spout to enable manual access to the split seal.

17. Method of replacing an annular seal between the inlet spout and the drum of a grain separator, comprising withdrawing axially movable seal-supporting structure axially away from the drum from a first position along the spout to provide manual access to the seal; disassembling the seal into two or more segments and removing the segments; installing a replacement seal about the spout by joining replacement seal segments together with a support ring; and axially restoring the seal supporting structure to its first position.

18. The method of claim 17 wherein said split seal, prior to disassembly, is manually moved axially away from the drum.

19. The method of claim 18 wherein the seal supporting structure includes a plurality of spring loaded plungers urging the split seal against an annular bearing surface of the drum, the method including the step of removing the spring-loaded plungers from an inlet plate to remove spring pressure from the split seal.

20. The method of claim 18 wherein the seal supporting structure includes an annular wave spring, the method including the step of withdrawing the wave spring and the split seal axially away from the drum.

* * * * *